Dec. 8, 1942.  O. STREUBEL  2,304,215

WIND WHEEL

Filed Aug. 20, 1941

INVENTOR
Otto Streubel
BY
ATTORNEY

Patented Dec. 8, 1942

2,304,215

UNITED STATES PATENT OFFICE 2,304,215

WIND WHEEL

Otto Streubel, New York, N. Y.

Application August 20, 1941, Serial No. 407,535

6 Claims. (Cl. 46—74)

This invention relates to new and useful improvements in a wind wheel.

More particularly, the invention contemplates a wind wheel which may be used as a toy. It is proposed that the wind wheel be capable of being rolled along the ground or thrown through the air.

Still further the invention proposes the construction of a wind wheel which is characterized by an annular rim member and a plurality of blades on the inner periphery thereof projecting alternately to opposite sides and inwardly thereof in a manner to act as sails when the wheel is thrown or rolled to be acted upon by changing and cross wind currents to control the movements of the wheel.

Still further the invention contemplates a novel arrangement for holding said blades in various inwardly projecting positions.

Another object of the invention is the construction of an article as mentioned which is simple and durable and which may be manufactured and sold at a reasonable cost.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
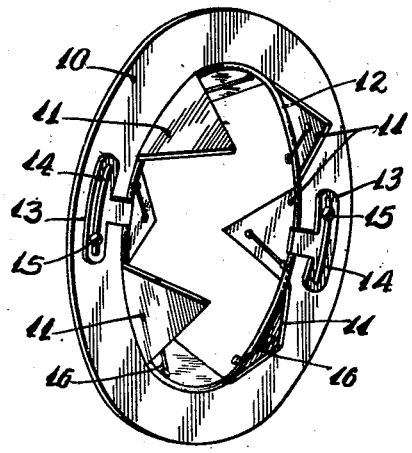
Fig. 1 is a perspective view of a wind wheel constructed in accordance with this invention.
Figure 3:
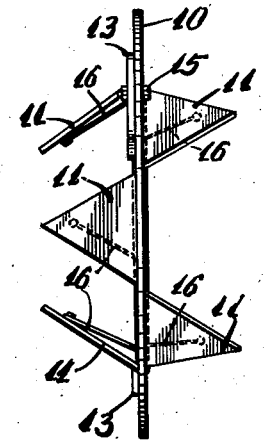
Fig. 3 is an end view of Fig. 2.
Figure 2:
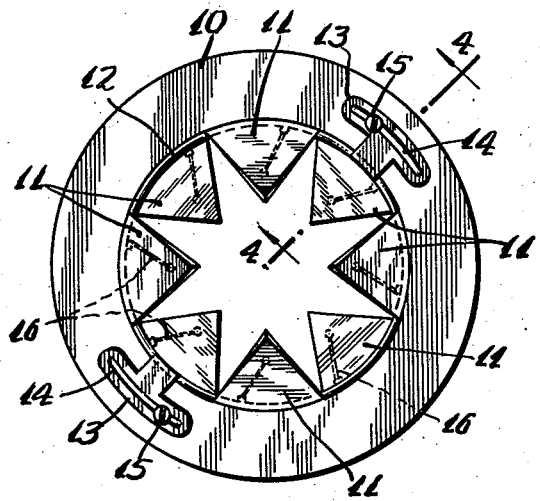
Fig. 2 is an elevational view of Fig. 1.
Figure 4:
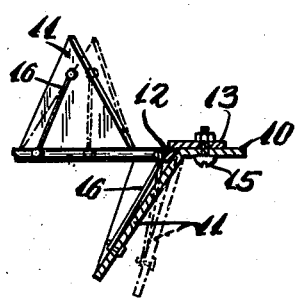
Fig. 4 is a fragmentary sectional view taken on the line 4—4 of Fig. 2.

The wind wheel, in accordance with this invention, includes an annular rim member 10, and a plurality of blades 11 on the inner periphery of the rim member 10 projecting alternately to opposite sides of said member and inwardly thereof. These blades 11 are substantially of triangular form and are connected at one of their sides with the material of the rim member 10. At this junction, the material is flexible so that the blades may be moved inwardly and outwardly as desired. In other words the bases of the blades act as a hinge construction allowing the desired movement. Preferably, the blades 11 are formed by starting with a flat disc and cutting radially from the center to divide off the various blades 11. Then these blades are bent laterally to project alternately to the sides of the rim member.

Means is provided for holding the blades 11 in various inwardly projecting positions. This means includes an annular member 12 in the nature of a wire ring located along the inner periphery of the rim member 10 and extending along alternate sides of adjacent blades 11. Lugs 13 are attached on diametrically opposite points of the ring 12 and extend flat against the rim member 10. These lugs 13 are formed with arcuate slots 14 concentric with the center of the annular rim member. Fastening elements 15 are mounted on the annular rim member and engage through said slots 14 by which the ring 12 may be held in various turned positions within the annular rim member 10.

A link 16 is provided for and pivotally connected with each blade 11 along its center line and near the apex thereof. These links 16 extend obliquely towards the ring 12 and are pivotally connected on the ring. When the fastening elements 15 are loosened and the lugs 13 shifted, to shift the ring 12, the links 16 will be moved and will force outwards or draw inwards the projecting blades 11 and so change their angular positions.

The wind wheel may be rolled along the ground or may be thrown through the air. A change in the angular positions of the blades will cause a different action during the operation and use of the wind wheel. More specifically, the blades 11 are designed to act as sails and be acted upon by changing and cross wind currents to influence the direction or flight of the wheel depending upon whether the wheel is rolled or thrown through the air.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A wind wheel, comprising an annular rim member, a plurality of blades on the inner periphery of said rim member projecting alternately to opposite sides of said member and inwardly thereof, and means for holding said blades in various inwardly projecting positions.

2. A wind wheel, comprising an annular rim member, a plurality of blades on the inner periphery of said rim member projecting alternately to opposite sides of said member and inwardly thereof, and means for holding said blades in various inwardly projecting positions, said annular rim member comprising a flat sheet of material.

3. A wind wheel, comprising an annular rim member, a plurality of blades on the inner periphery of said rim member projecting alternately to opposite sides of said member and inwardly thereof, and means for holding said blades in various inwardly projecting positions, said annular rim member comprising a flat sheet of material, and said blades being bent from the material which forms said rim member.

4. A wind wheel, comprising an annular rim member, a plurality of blades on the inner periphery of said rim member projecting alternately to opposite sides of said member and inwardly thereof, and means for holding said blades in various inwardly projecting positions, said blades being substantially of triangular form.

5. A wind wheel, comprising an annular rim member, a plurality of blades on the inner periphery of said rim member projecting alternately to opposite sides of said member and inwardly thereof, and means for holding said blades in various inwardly projecting positions, comprising a ring disposed within the inner periphery of said annular rim member and extending along opposite faces of adjacent blades, means for holding said ring in various turned positions, and links pivotally connected with said ring and pivotally connected with points near the apexes of said blades.

6. A wind wheel, comprising an annular rim member, a plurality of blades on the inner periphery of said rim member projecting alternately to opposite sides of said member and inwardly thereof, and means for holding said blades in various inwardly projecting positions, comprising a ring disposed within the inner periphery of said annular rim member and extending along opposite faces of adjacent blades, means for holding said ring in various turned positions, and links pivotally connected with said ring and pivotally connected with points near the apexes of said blades, said means for holding the ring comprising lugs on the ring and formed with arcuate slots, and fastening elements engaging through said slots and mounted on said rim member.

OTTO STREUBEL.